United States Patent
Brice et al.

(10) Patent No.: US 7,561,963 B2
(45) Date of Patent: Jul. 14, 2009

(54) SYSTEM, METHOD, AND COMPUTER PROGRAM PRODUCT FOR COMPARING THE COST OF DRIVING AN OWNED OR LEASED VEHICLE TO THE COST VARIOUS TRANSPORTATION OPTIONS

(75) Inventors: Tony Brice, Colleyville, TX (US); Russell L. Strothmann, Broken Arrow, OK (US); Amela Abadzic, Plano, TX (US)

(73) Assignee: Sabre Inc., Southlake, TX (US)

( * ) Notice: Subject to any disclaimer, the term of this patent is extended or adjusted under 35 U.S.C. 154(b) by 555 days.

(21) Appl. No.: 11/246,644

(22) Filed: Oct. 7, 2005

(65) Prior Publication Data

US 2007/0083327 A1    Apr. 12, 2007

(51) Int. Cl.
*G06F 19/00*    (2006.01)
(52) U.S. Cl. .............................. 701/210; 701/123; 705/6
(58) Field of Classification Search ................. 701/123, 701/210; 705/6
See application file for complete search history.

(56) References Cited

U.S. PATENT DOCUMENTS 5,948,040 A * 9/1999 DeLorme et al. ............ 701/201

OTHER PUBLICATIONS

Transportation Cost and Benefit Analysis—Vehicle Costs; Victoria Transport Policy Institute (www.vtpi.org); pp. 5.1-1-5.1-13.

* cited by examiner

*Primary Examiner*—Yonel Beaulieu
(74) *Attorney, Agent, or Firm*—Alston & Bird LLP

(57) ABSTRACT

A system, method, and computer program product calculate the cost for a traveler to drive the traveler's personal vehicle on a trip of a defined distance and duration, and compare the cost of driving the traveler's personal vehicle to the cost of other transportation options, such as the cost of renting a vehicle and driving the rental vehicle on the trip. In this regard, a system for comparing a cost of driving a traveler's vehicle to a cost of other transportation options comprises a server capable of calculating a total cost to drive the traveler's vehicle on a trip. The server is further capable of calculating a total cost to drive a rental vehicle on the trip. The server is further capable of comparing the total cost to drive the traveler's vehicle on the trip to the total cost to drive the rental vehicle on the trip.

36 Claims, 8 Drawing Sheets

FIG. 2

| Year | Make | Model | Engine Size | Cyl. | Transmission | MPG | Moderate | Significant | Mileage Lifespan | Maint.1 | Maint. 2 | Deprec. Scale | Base Cost | Residual |
|---|---|---|---|---|---|---|---|---|---|---|---|---|---|---|
| 2005 | ACURA | MDX 4WD | 3.5 | 6 | AUTOMATIC | 23 | 90000 | 120000 | 200000 | 0.072 | 0.055 | 1 | 38000 | 0.15 |
| 2005 | ACURA | NSX | 3 | 6 | AUTOMATIC | 24 | 90000 | 120000 | 200000 | 0.072 | 0.055 | 1 | 89000 | 0.15 |
| 2005 | ACURA | NSX | 3.2 | 6 | MANUAL | 24 | 90000 | 120000 | 200000 | 0.072 | 0.055 | 1 | 89000 | 0.15 |
| 2005 | ACURA | RL | 3.5 | 6 | AUTOMATIC | 26 | 90000 | 120000 | 200000 | 0.072 | 0.055 | 1 | 48000 | 0.15 |
| 2005 | ACURA | RSX | 2 | 4 | AUTOMATIC | 34 | 90000 | 120000 | 200000 | 0.072 | 0.055 | 1 | 23000 | 0.15 |
| 2005 | ACURA | RSX | 2 | 4 | MANUAL | 34 | 90000 | 120000 | 200000 | 0.072 | 0.055 | 1 | 22000 | 0.15 |
| 2005 | ACURA | TL | 3.2 | 6 | AUTOMATIC | 29 | 90000 | 120000 | 200000 | 0.072 | 0.055 | 1 | 32000 | 0.15 |
| 2005 | ACURA | TL | 3.2 | 6 | MANUAL | 29 | 90000 | 120000 | 200000 | 0.072 | 0.055 | 1 | 31000 | 0.15 |
| 2005 | ACURA | TSX | 2.4 | 4 | AUTOMATIC | 30 | 90000 | 120000 | 200000 | 0.072 | 0.055 | 1 | 26000 | 0.15 |
| 2005 | ACURA | TSX | 2.4 | 4 | MANUAL | 31 | 90000 | 120000 | 200000 | 0.072 | 0.055 | 1 | 27000 | 0.15 |
| 2005 | AUDI | A4 | 1.8 | 4 | AUTOMATIC | 29 | 60000 | 90000 | 120000 | 0.120 | 0.092 | 1 | 25000 | 0.1 |
| 2005 | AUDI | A4 | 3 | 6 | AUTOMATIC | 29 | 60000 | 90000 | 120000 | 0.120 | 0.092 | 1 | 28000 | 0.1 |
| 2005 | AUDI | A4 | 1.8 | 4 | MANUAL | 31 | 60000 | 90000 | 120000 | 0.120 | 0.092 | 1 | 24000 | 0.1 |
| 2005 | AUDI | A4 AVANT QUATTRO | 3 | 6 | AUTOMATIC | 26 | 60000 | 90000 | 120000 | 0.120 | 0.092 | 1 | 29000 | 0.1 |
| 2005 | AUDI | A4 AVANT QUATTRO | 3 | 6 | MANUAL | 26 | 60000 | 90000 | 120000 | 0.120 | 0.092 | 1 | 28000 | 0.1 |
| 2005 | AUDI | A4 AVANT QUATTRO | 1.8 | 4 | AUTOMATIC | 29 | 60000 | 90000 | 120000 | 0.120 | 0.092 | 1 | 29000 | 0.1 |
| 2005 | AUDI | A4 AVANT QUATTRO | 1.8 | 4 | MANUAL | 30 | 60000 | 90000 | 120000 | 0.120 | 0.092 | 1 | 28000 | 0.1 |
| 2005 | AUDI | A4 CABRIOLET | 3 | 6 | AUTOMATIC | 29 | 60000 | 90000 | 120000 | 0.120 | 0.092 | 1 | 35000 | 0.1 |
| 2005 | AUDI | A4 CABRIOLET | 1.8 | 4 | AUTOMATIC | 30 | 60000 | 90000 | 120000 | 0.120 | 0.092 | 1 | 35000 | 0.1 |
| 2005 | AUDI | A4 CABRIOLET QUATTRO | 3 | 6 | AUTOMATIC | 26 | 60000 | 90000 | 120000 | 0.120 | 0.092 | 1 | 44000 | 0.1 |
| 2005 | AUDI | A4 QUATTRO | 3 | 6 | AUTOMATIC | 26 | 60000 | 90000 | 120000 | 0.120 | 0.092 | 1 | 28000 | 0.1 |
| 2005 | AUDI | A4 QUATTRO | 3 | 6 | MANUAL | 26 | 60000 | 90000 | 120000 | 0.120 | 0.092 | 1 | 27000 | 0.1 |
| 2005 | AUDI | A4 QUATTRO | 1.8 | 4 | AUTOMATIC | 29 | 60000 | 90000 | 120000 | 0.120 | 0.092 | 1 | 28000 | 0.1 |
| 2005 | AUDI | A4 QUATTRO | 1.8 | 4 | MANUAL | 30 | 60000 | 90000 | 120000 | 0.120 | 0.092 | 1 | 27000 | 0.1 |
| 2005 | AUDI | A6 QUATTRO | 4.2 | 8 | AUTOMATIC | 23 | 60000 | 90000 | 120000 | 0.120 | 0.092 | 1 | 50000 | 0.1 |
| 2005 | AUDI | A8 | 4.2 | 8 | AUTOMATIC | 24 | 60000 | 90000 | 120000 | 0.120 | 0.092 | 1 | 68000 | 0.1 |
| 2005 | AUDI | A8 L | 6 | 12 | AUTOMATIC | 21 | 60000 | 90000 | 120000 | 0.120 | 0.092 | 1 | 70000 | 0.1 |
| 2005 | AUDI | A8 L | 4.2 | 8 | AUTOMATIC | 24 | 60000 | 90000 | 120000 | 0.120 | 0.092 | 1 | 68000 | 0.1 |
| 2005 | AUDI | ALLROAD QUATTRO | 4.2 | 8 | AUTOMATIC | 21 | 60000 | 90000 | 120000 | 0.120 | 0.092 | 1 | 47000 | 0.1 |
| 2005 | AUDI | ALLROAD QUATTRO | 2.7 | 6 | AUTOMATIC | 22 | 60000 | 90000 | 120000 | 0.120 | 0.092 | 1 | 40000 | 0.1 |
| 2005 | AUDI | ALLROAD QUATTRO | 2.7 | 6 | MANUAL | 23 | 60000 | 90000 | 120000 | 0.120 | 0.092 | 1 | 40000 | 0.1 |
| 2005 | AUDI | S4 | 4.2 | 8 | AUTOMATIC | 21 | 60000 | 90000 | 120000 | 0.120 | 0.092 | 1 | 46000 | 0.1 |
| 2005 | AUDI | S4 | 4.2 | 8 | MANUAL | 24 | 60000 | 90000 | 120000 | 0.120 | 0.092 | 1 | 47000 | 0.1 |
| 2005 | AUDI | S4 AVANT | 4.2 | 8 | AUTOMATIC | 21 | 60000 | 90000 | 120000 | 0.120 | 0.092 | 1 | 46000 | 0.1 |
| 2005 | AUDI | S4 AVANT | 4.2 | 8 | MANUAL | 24 | 60000 | 90000 | 120000 | 0.120 | 0.092 | 1 | 47000 | 0.1 |
| 2005 | AUDI | S4 CABRIOLET | 4.2 | 8 | AUTOMATIC | 21 | 60000 | 90000 | 120000 | 0.120 | 0.092 | 1 | 54000 | 0.1 |
| 2005 | AUDI | S4 CABRIOLET | 4.2 | 8 | AUTOMATIC | 23 | 60000 | 90000 | 120000 | 0.120 | 0.092 | 1 | 54000 | 0.1 |
| 2005 | AUDI | TT COUPE | 1.8 | 4 | AUTOMATIC | 29 | 60000 | 90000 | 120000 | 0.120 | 0.092 | 1 | 37000 | 0.1 |
| 2005 | AUDI | TT COUPE QUATTRO | 3.2 | 6 | AUTOMATIC | 27 | 60000 | 90000 | 120000 | 0.120 | 0.092 | 1 | 37000 | 0.1 |

FIG. 5

Welcome to the Transportation Cost Comparison Calculator

How much does it cost to drive your car compared to renting a car for the same trip?

Do you own or lease your personal vehicle? [Own] — 50, 54

Model year? [1998] — 56

Vehicle make? [Ford] — 58

Vehicle model? [Explorer] — 60

Engine size? [4.0L] — 62

Number of cylinders? [6] — 64

Transmission type? [Automatic] — 66

Current mileage? [80,001 – 90,000]

[Continue] — 52

Welcome to the Transportation Cost Comparison Calculator

How much does it cost to drive your car compared to renting a car for the same trip?

| | | |
|---|---|---|
| Do you own or lease your personal vehicle? | Lease ▸ | —50 |
| Model year? | 2005 ▸ | —54 |
| Vehicle make? | Ford ▸ | —56 |
| Vehicle model? | Explorer ▸ | —58 |
| Engine size? | 4.0L ▸ | —60 |
| Number of cylinders? | 6 ▸ | —62 |
| Transmission type? | Automatic ▸ | —64 |
| Do you plan to purchase at lease end? | No ▸ | —68 |
| If no, will this trip fit within your allowed miles? | No ▸ | —70 |
| If no, what is your extra cost per mile? | $0.15 ▸ | —72 |

Welcome to the Transportation Cost Comparison Calculator

How much does it cost to drive your car compared to renting a car for the same trip?

Cost of driving your car [____] 99 rental vehicle — 96

Cost of driving [____] rental vehicle — 98, 100, 102

Net cost/savings for [____] rental vehicle — 104

Daily cost/savings for [____] rental vehicle — 106, 108

Risk of mechanical problem with your vehicle — 86

Gasoline cost per gallon assumption [$2.80] — 90

Rental vehicle type [Intermediate ▼] — 92

Rental vehicle company [National ▼]

[Recalculate Costs] — 110

SYSTEM, METHOD, AND COMPUTER PROGRAM PRODUCT FOR COMPARING THE COST OF DRIVING AN OWNED OR LEASED VEHICLE TO THE COST VARIOUS TRANSPORTATION OPTIONS

FIELD OF THE INVENTION

Embodiments of the invention relate generally to travel planning systems, and more particularly, to systems, methods, and computer program products for comparing the costs of various transportation options.

BACKGROUND OF THE INVENTION

The Internet, and specifically the World Wide Web, has made travel planning quite easy. Travel planning websites have enabled travelers to research, plan, and book travel without the assistance of a travel agent. In particular, booking transportation options, such as an airline flight from city A to city B or a rental car in city A in order to drive to city B, is readily performed using a travel planning website. Using the travel planning website, the traveler can easily determine the cost of such an airline ticket or rental car reservation.

Often, a traveler is planning a trip to a destination that is a far enough distance from the departure location that the traveler is considering flying, but for which driving may be a desirable alternative for the traveler. Additionally, the traveler may be considering either driving the traveler's own vehicle, which is either owned or leased by the traveler, or renting a vehicle to drive to the destination. A leased vehicle is typically leased from an automobile manufacturer or a leasing service company, and is typically leased for a period of months or years. A rental vehicle is typically rented from a vehicle rental agency, and is typically rented for a period of days or weeks. The traveler may consider renting a vehicle, rather than driving the traveler's own vehicle, for many reasons. For example, the traveler's own vehicle may be older and less reliable than vehicles from a rental agency (termed rental vehicles), which tend to be fairly new. Additionally, the traveler's own vehicle may be less fuel efficient than some of the available rental vehicles. Or the traveler may desire a specialized vehicle for the trip, such as a van or convertible, depending upon the cost of such a specialized vehicle.

It may be difficult, however, for the traveler to know the accurate and complete cost of driving the traveler's own vehicle. The traveler may know, for example, the fuel efficiency of the traveler's own vehicle and can therefore calculate the anticipated fuel costs for a particular trip. However, the traveler may not know, or even be aware of, other costs incurred by driving the traveler's own vehicle, such as the reduction in value of the vehicle due to the increased mileage of the vehicle and the "wear and tear" on the vehicle resulting from the drive. As such, it may be difficult to compare the cost of driving the traveler's own vehicle to the cost of other transportation options, such as renting a vehicle or flying, in order to determine which method of transportation is least expensive. Additionally, the traveler may have difficulty factoring other considerations, such as the likelihood of mechanical failure of the traveler's vehicle, into the decision of which transportation method to use.

As such, there is a need for a system, method, and computer program product capable of comparing the cost of driving the traveler's own vehicle to the cost of various other transportation options.

BRIEF SUMMARY OF THE INVENTION

A system, method, and computer program product are therefore provided that calculate the cost for a traveler to drive the traveler's personal vehicle on a trip of a defined distance and duration, and compare the cost of driving the traveler's personal vehicle to the cost of other transportation options, such as renting a vehicle and driving the rental vehicle on the trip.

In this regard, a system for comparing a cost of driving a traveler's vehicle to a cost of other transportation options comprises a computing device capable of calculating a total cost to drive the traveler's vehicle on a trip, the traveler's vehicle being defined by a vehicle make, a vehicle model, and a year of manufacture, and the trip being at least partially defined by a number of miles from a departure location to a destination location. The traveler's vehicle may be owned by the traveler, or may be leased by the traveler; either individually or by the employer or other company with which the traveler is affiliated. The traveler's vehicle may be further defined by at least one of a mileage, an engine size, a number of cylinders, and a transmission type. The computing device is further capable of calculating a total cost to drive a rental vehicle on the trip, the trip being further defined by a number of days from a beginning of the trip to an end of the trip and the rental vehicle being defined by a vehicle type. The computing device is further capable of comparing the total cost to drive the traveler's vehicle on the trip to the total cost to drive the rental vehicle on the trip.

In one embodiment, the computing device may calculate the total cost to drive the traveler's vehicle on the trip based on a fuel cost per gallon, a fuel economy of the traveler's vehicle, and a maintenance cost per mile. Additionally, the computing device may calculate the total cost to drive the traveler's vehicle on the trip further based on a depreciation cost per mile if a mileage of the traveler's vehicle is less than a predefined lifespan mileage of the traveler's vehicle, and further based on a second maintenance cost per mile if the mileage of the traveler's vehicle is greater than the predefined lifespan mileage of the traveler's vehicle. The computing device may calculate the total cost to drive the traveler's vehicle on the trip further based on a cost of lodging and a cost of meals during the trip.

The computing device may calculate the total cost to drive the traveler's vehicle on the trip further based on a contract mileage overage fee if the traveler's vehicle is leased by the traveler and if the mileage of the traveler's vehicle is greater than a predefined contract mileage limit. The computing device may calculate the total cost to drive the traveler's vehicle on the trip further based on a depreciation cost per mile if the traveler is planning to buy the vehicle after an expiration of a predefined lease period.

The computing device may be further capable of calculating a total cost to travel on the trip via at least one additional transportation mode selected from the group comprising commercial airline, bus, and train, and comparing the total cost to travel via the at least one additional transportation mode to the total cost to drive the traveler's vehicle on the trip and to the total cost to drive the rental vehicle on the trip. The computing device may be further capable of calculating a probability of an occurrence in the traveler's vehicle of a mechanical problem during the trip.

In one embodiment, the traveler's vehicle may be a traveler's first vehicle, and the computing device may be further capable of calculating a total cost to drive at least one additional traveler's vehicle on the trip and comparing the total cost to drive the traveler's first vehicle and the at least one additional traveler's vehicle on the trip to the total cost to drive the rental vehicle on the trip.

In addition to the system for comparing a cost of driving a traveler's vehicle to a cost of other transportation options as described above, other aspects of the invention are directed to corresponding methods and computer program products for comparing a cost of driving a traveler's vehicle to a cost of other transportation options.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 is an illustration of a subset of a vehicle database, according to one embodiment of the invention;

FIGS. 4-7 are screen shots of request entry screens for entering a request to compare the costs of transportation options, according to one embodiment of the invention; and FIG. 8 is a screen shot of a results screen comparing the costs of transportation options, according to one embodiment of the invention.

DETAILED DESCRIPTION OF THE INVENTION

Embodiments of the invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. While embodiments of the invention are described primarily in terms of units of measurement and currency applicable to the United States, it should be appreciated that embodiments of the invention may be adapted for use with units of measurement and currency applicable to any desired country.

Figure 1:
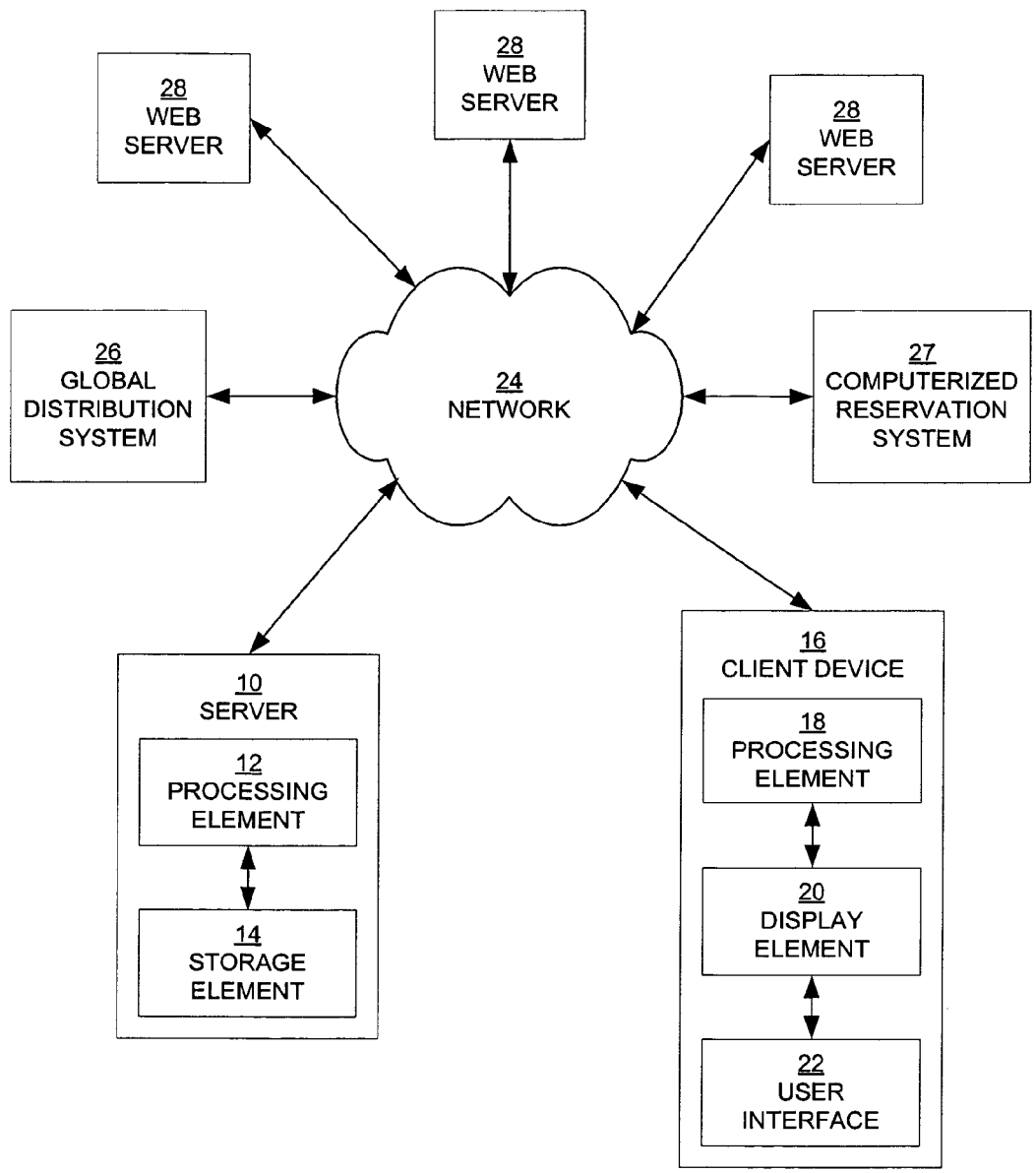
FIG. 1 is a schematic block diagram of a system for comparing the costs of transportation options, according to one embodiment of the invention.

FIG. 1 is a schematic block diagram of a system for comparing the costs of transportation options, according to one embodiment of the invention. FIG. 1 illustrates a system using a client/server configuration. The system of FIG. 1 comprises a pair of computing devices, such as a server 10 and a client device 16, in communication over a network 24, such as the Internet. The server 10 comprises a processing element 12 and a storage element 14. The client device comprises a processing element 18, a display element 20, and a user interface 22. The client device 16 would typically be a personal computer, but may be any suitable device, including but not limited to telephones (including landline, mobile, web-enabled, etc.), laptop computers, mobile computers, pocket PCs, Blackberries™, and the like. The display element 20 may be, for example, a CRT or LCD, and the user interface may be, for example, a keyboard and/or a pointing device such as a mouse.

When a traveler desires to compare the cost of driving the traveler's personal vehicle (e.g., car, truck, van, sport utility vehicle) on a trip of a defined length to the cost of other transportation options, including but not limited to driving a rental vehicle, flying, traveling by bus, traveling by train, or as part of a multi-mode trip such as a tour, the traveler may enter a request (discussed in more detail below) via client 16 using user interface 22. While comparing the cost of driving the traveler's personal vehicle to the cost of driving a rental vehicle will be described in detail herein, it should be appreciated that embodiments of the invention may be used to compare the cost of driving the traveler's personal vehicle to the cost of any other transportation option for which cost information is available. As used herein and as noted above, the traveler's personal vehicle may be owned by the traveler or may be leased by the traveler. In this regard, the ownership or lease of the vehicle may be by the traveler individually or by the employer or other corporate entity with which the individual traveler is employed or affiliated, with the vehicle being considered a personal vehicle in either instance.

Processing element 18 may transmit the request to the server 10 over network 24. In response to the traveler's request, the processing element 12 of server 10 may access vehicle-specific information corresponding to the traveler's request and use the accessed information to calculate the per-mile cost of driving the traveler's personal vehicle and the total cost of driving the traveler's personal vehicle on the defined trip (discussed in more detail below). The information would typically be accessed from a vehicle database stored in storage element 14. The cost and comparison information may then be transmitted by the server 10 to the client device 16, where the information may be displayed for the traveler on the display element 20.

The vehicle database stored in the storage element will typically contain operating cost information, maintenance cost information, and reliability information regarding a large number of vehicles. The information contained in the database will typically enable the processing element 12 of the server 10 to calculate the per-mile cost and the total cost of driving a personal vehicle on a trip of a defined number of miles. For example, the vehicle database may contain the following information for each vehicle in the database: fuel economy information (i.e., miles per gallon or MPG), maintenance costs (on a per mile basis), depreciation, replacement cost, and residual value. The vehicle database may also contain information to enable the processing element 12 to determine the likelihood of mechanical failure occurring in the traveler's vehicle. The vehicle database will typically contain enough vehicle descriptive information to enable the retrieval from the database of cost and reliability information corresponding to the traveler's vehicle. FIG. 2 is an illustration of a subset of a vehicle database, according to one embodiment of the invention. In the exemplary embodiment of FIG. 2, the vehicle database contains the following data fields: model year; make (e.g., Acura), model (e.g., RSX); engine size (in liters); number of cylinders; transmission type (manual or automatic); fuel economy (e.g., this may be city MPG, highway MPG, both, or an average of city and highway); a moderate reliability mileage threshold (i.e., if the current vehicle mileage is above this threshold then the risk of a mechanical failure in the vehicle is moderate); a significant reliability mileage threshold (i.e., if the current vehicle mileage is above this threshold then the risk of a mechanical failure in the vehicle is significant); a mileage lifespan (i.e., the number of miles that a vehicle owner may expect to be able drive the vehicle during the life of the vehicle); a first maintenance cost (i.e., the per-mile expected maintenance cost; this amount would typically apply to each mile driven regardless of the current vehicle mileage); a second maintenance cost (i.e., the per-mile expected maintenance cost when the current vehicle mileage exceeds the mileage lifespan; this amount would typically be in addition to the first maintenance cost and reflects the additional maintenance which is typically required when the mileage lifespan is exceeded); one or more depreciation scales (one scale is illustrated in FIG. 2) (depreciation is the cost of replacing a vehicle minus the vehicle's residual value, all divided by the mileage lifespan; once the vehicle's mileage exceeds the mileage lifespan, the depreciation effectively is zero); a vehicle replacement cost (this may be the current manufacturer's suggested retail price (MSRP) of the currently available vehicle that is most similar to the vehicle, or may be the MSRP of the specific vehicle at the time of purchase); and a residual value (which may be expressed as a dollar amount or a percentage of the vehicle replacement cost).

As mentioned above, depreciation may be defined as the cost of replacing a vehicle less the vehicle's residual value divided by the vehicle's normal lifespan, and one or more different depreciation scales may be used. For example, one depreciation scale may be a straight line depreciation, in which the depreciation is constant over the vehicle lifespan. Another depreciation scale may be an accelerated depreciation in which 50% of the depreciation occurs during the first 33.3% of the vehicle lifespan. Yet another depreciation scale may be an accelerated depreciation in which 66.7% of the depreciation occurs during the first 33.3% of the vehicle lifespan. A single depreciation scale may be used to calculate the depreciation for all vehicles, the depreciation scale used may be selected by a traveler, or the depreciation scale may vary depending on the specific vehicle in the database.

It may be difficult to determine the vehicle replacement cost for a vehicle model which is no longer manufactured. For such vehicles, the vehicle replacement cost in the database may be the current MSRP of the currently available vehicle that is most similar to the vehicle. For some models that are no longer manufactured, a similar model of the same make may be used to determine the vehicle replacement cost. For example, the replacement value of an older BMW 323 series may be determined based on the similar and currently available BMW 325 series. In some situations, an entire make of vehicle may no longer be available, and a similar model of a similar make may be used to determine the vehicle replacement cost. For example, Oldsmobile vehicles are no longer manufactured, so the replacement value of an Oldsmobile Cutlass may be determined based on the similar and currently available Buick Century.

Server 10 may communicate over network 24 with a global distribution system (GDS) 26 to obtain cost information for various other transportation options, such as rental vehicles, airline flights, or train travel. The various GDSs, such as Sabre, Amadeus, Galileo, and WorldSpan, act as middlemen to sell bookable travel components, such as airline tickets, through various customer channels, such as travel agencies and the travel planning websites. The cost information for these various other transportation options may then be compared by the processing element 12 to the calculated cost of driving the traveler's personal vehicle. Additionally or alternatively, cost information for various other transportation options may be obtained from a computerized reservation system (CRS) 27, such as the reservation system for an airline or a car rental agency. Cost information may also be obtained from the computer systems of individual suppliers or vendors of transportation information and/or reservations, or from any suitable provider of transportation pricing. Although cost information may be obtained from many different sources, the use of GDSs and CRSs will be primarily discussed herein.

Server 10 may also communicate over network 24 with many different sources of transportation information, such as web servers 28, to obtain more recent information regarding the vehicles in the vehicle database, as well as regarding new vehicles to be added to the database. The processing element will then typically store the updated information in the vehicle database in storage element 14.

While FIG. 1 illustrates a system of one embodiment of the invention using a client/server configuration, it should be appreciated that the client/server configuration is shown for example purposes only and that the system of other embodiments of the invention could utilize configurations other than client/server. It should also be appreciated that the overall system architecture shown in FIG. 1 is for example purposes only, and not intended to limit the scope of the invention. Embodiments of the system of the invention could be implemented using a number of different system configurations and/or computing devices.

Figure 3:
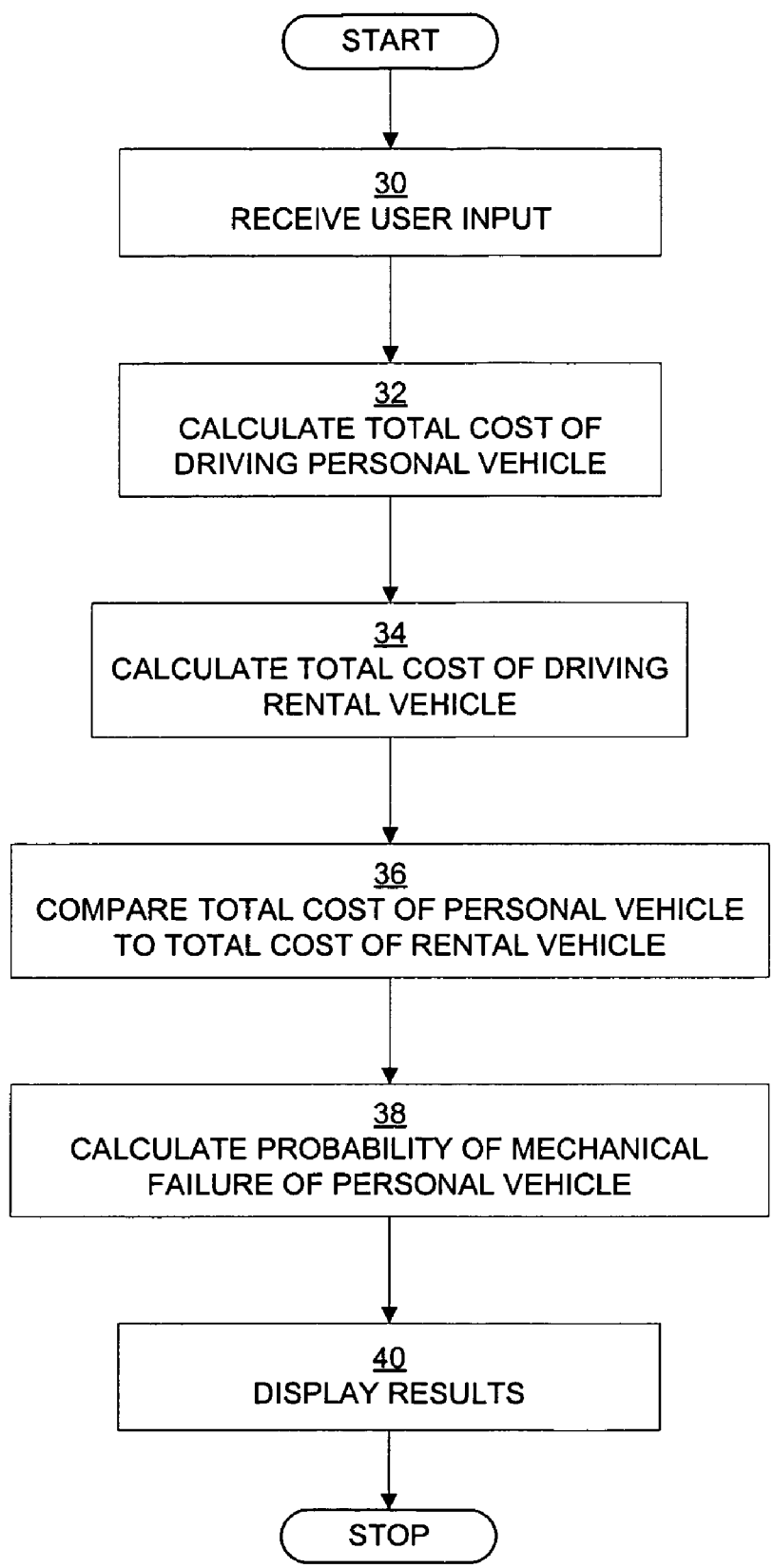
FIG. 3 is a flowchart of the operation of comparing the costs of transportation options, according to one embodiment of the invention.

Referring now to FIG. 3, a flowchart of the operation of the server and the client comparing the costs of transportation options is illustrated, according to one embodiment of the invention. As discussed above, a traveler may enter a request for a comparison of the cost of driving the traveler's personal vehicle on a trip of a defined length to the cost of other transportation options, such as driving a rental vehicle or flying. To enter such a request, the traveler would typically enter information regarding the traveler's personal vehicle and the planned trip via the user interface 22 of client 16. The entered information would then typically be received by the server 10. See block 30 of FIG. 3. The information requested from the traveler may vary, but would typically include enough information to specifically identify the traveler's vehicle and access the corresponding cost information. For example, the traveler may first specify whether the traveler owns or leases the vehicle. Some of the cost information, such as the depreciation, may differ depending on whether the vehicle is owned or leased. While embodiments of the invention will be described in which the traveler is prompted to input all of the required information, some of the required information needed to calculate and compare the costs of various transportation options may have been previously obtained from the traveler and may be stored in a user profile in storage element 14. In one exemplary embodiment of the invention, the calculation and comparison of the costs of various transportation options may be provided by a travel planning website. A traveler may have previously established a user profile into which personal information necessary for travel planning (e.g., the traveler's name, address, credit card information, preferred airline, preferred vehicle rental company, and the like) may have been input. In such an embodiment, the traveler may also input information regarding the traveler's personal vehicle into the user profile to enable the calculation and comparison of the costs of various transportation options.

Figure 4:
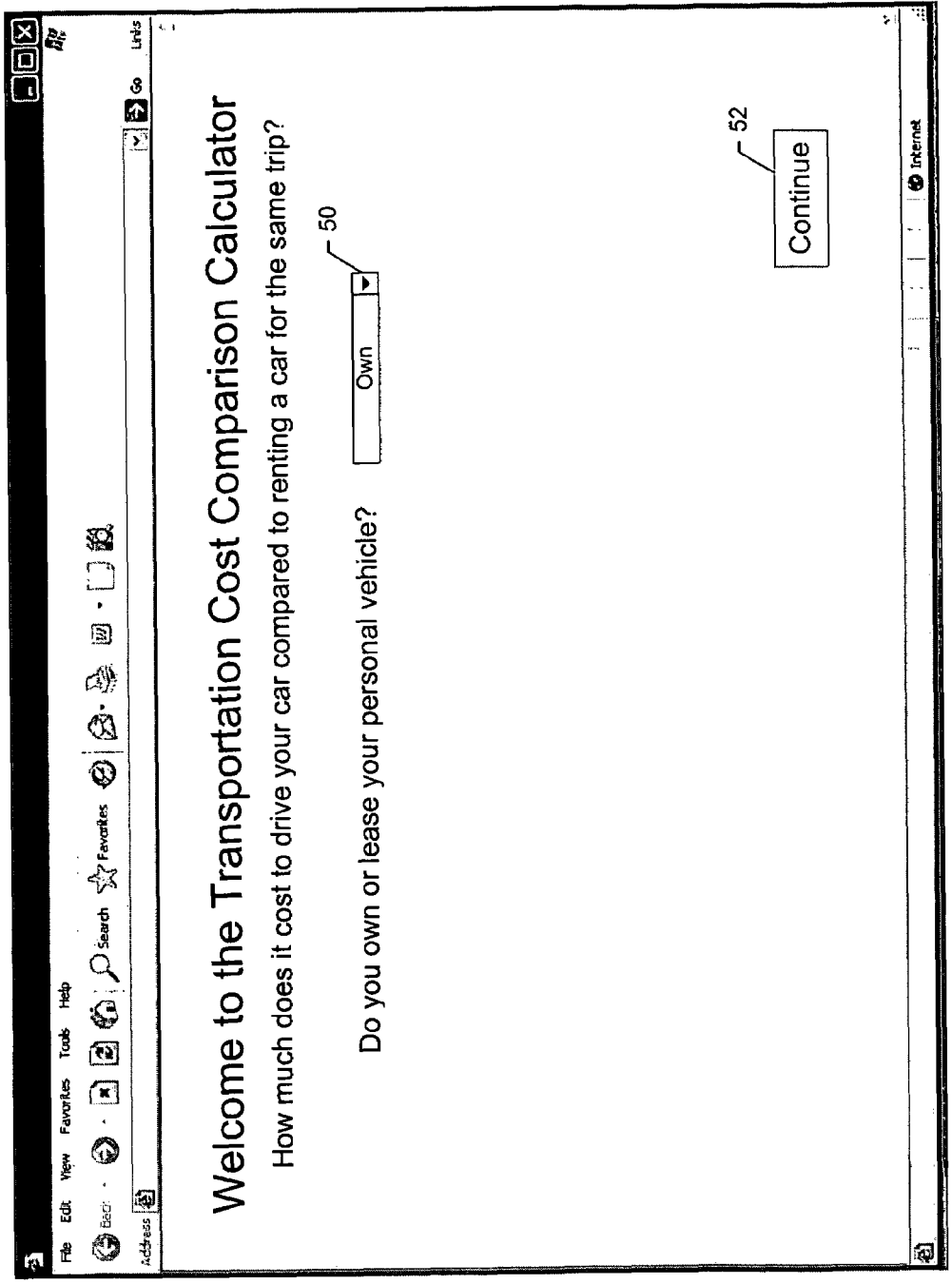

Referring now to FIG. 4, a screen shot of request entry screen for entering a request to compare the costs of transportation options is illustrated, according to one embodiment of the invention. Typically, the request entry screen is depicted by the display element 20 in response to commands from the processing element 18 of the client device 16 which, in turn, is typically responding to instructions from the processing element 12 of the server 10. In the request entry screen of FIG. 4, the traveler is prompted to specify whether the traveler owns or leases the vehicle. Drop down box 50 enables the traveler to select "Own" or "Lease." The traveler would then typically select the "Continue" button 52 to proceed to the next entry screen. The next entry screen that is displayed would typically vary depending on whether the traveler selected "Own" or "Lease," as different information would typically be requested from the traveler depending on whether the vehicle is owned or leased. Referring now to FIG. 5, a screen shot in which the traveler is prompted to enter information corresponding to an owned vehicle is illustrated, according to one embodiment of the invention. As before, the screen shot of FIG. 5 is generally depicted by the display element 20 in response to commands from the processing element 18 of the client device 16 which, in turn, is typically responding to instructions from the processing element 12 of the server 10. In the request entry screen of FIG. 5, the drop down list 50 for selecting "Own" or "Lease" may be displayed again to enable the traveler to change the selection. The traveler is typically prompted to enter the model year of the traveler's personal vehicle, such as by using drop down list 54. The options presented in drop down list 54 would typically correspond to the different model years for which vehicle information is contained in the vehicle database. The number of model years presented (and contained in the database) may be limited to limit the size of the database, and because the information in the database may be harder to obtain and keep updated for older vehicles. For example, the database may only contain information for the current model year and the previous nine or fourteen model years (for a total of ten or fifteen model years, respectively).

The traveler is typically prompted to enter the vehicle make, such as by using drop down list 56. The drop down list 56 would typically enable the traveler to select a make of vehicle for which information is contained in the database and which corresponds to the selected model year. A vehicle database may contain, for example, approximately forty-five makes corresponding to each model year. The traveler is typically prompted to enter the vehicle model, such as by using drop down list 58. The drop down list 58 would typically enable the traveler to select a model of vehicle for which information is contained in the database and which corresponds to the selected model year and make. A vehicle database may contain, for example, as many as approximately fifty-five models for some makes and fewer than ten models for some makes.

The traveler is typically prompted to enter the engine size (typically in liters, but may also be in cubic centimeters, cubic inches, or any other standard engine size measurement) of the traveler's personal vehicle, such as by using drop down list 60. The drop down list 60 would typically enable the traveler to select an engine size for which information is contained in the database and which corresponds to the selected model year, make, and model. In addition to selections for each engine size contained in the vehicle database, the engine size drop down list 60 may include an "unknown" option that the traveler may select if the traveler does not know the engine size. If the traveler selects the "unknown" option, the processing element 12 may calculate the cost using the largest engine size number in the database for that year, make, and model, as the cost would likely be highest for the largest engine size.

The traveler is typically prompted to enter the number of cylinders of the traveler's personal vehicle, such as by using drop down list 62. The drop down list 62 would typically enable the traveler to select a number of cylinders for which information is contained in the database and which corresponds to the selected model year, make, model, and engine size (if entered). In addition to selections for each number of cylinders contained in the vehicle database, the cylinder number drop down list 62 may include an "unknown" option that the traveler may select if the traveler does not know the number of cylinders. If the traveler selects the "unknown" option, the processing element 12 may calculate the cost using the largest number of cylinders in the database for that year, make, and model, as the cost would likely be highest for the largest number of cylinders. If the traveler selects "unknown" in the engine size drop down box (and therefore the processing element has "presumed" the largest engine size to calculate the cost), but selects a number of cylinders in the cylinder drop down box, it is possible that the presumed engine size will not have a corresponding database entry corresponding to the selected number of cylinders. In that situation, the processing element may change the engine size presumption to largest engine in the database corresponding to the selected number of cylinders. If the traveler enters a value that does not match any of the database entries, the processing element 12 may calculate the costs using the vehicle in the database that most closely matches the entered values, or may extrapolate or otherwise estimate the cost based on the data for two or more vehicles in the database that closely match the entered values. Alternatively, if the traveler enters a value that does not match any of the database entries, the processing element 12 may cause an error message to be displayed by the display element 20 to prompt the traveler to reenter the value.

The traveler is typically prompted to enter the transmission type (i.e., manual or automatic) of the traveler's personal vehicle, such as by using drop down list 64. The drop down list 64 would typically enable the traveler to select a transmission type for which information is contained in the database and which corresponds to the selected model year, make, model, engine size (if entered), and number of cylinders (if entered). If the traveler selects a transmission type that does not appear in the database for the selected model year, make, model, engine size, and number of cylinders, the processing element 12 may calculate the cost using the transmission type that appears in the database for the selected model year, make, model, engine size, and number of cylinders.

The traveler is typically prompted to enter the current mileage of the traveler's personal vehicle, such as by using drop down list 66. The drop down list 66 would typically enable the traveler to select the mileage in predefined increments, such as increments of 10,000 miles. For example, the selections in the mileage drop down list 66 may be: 0-10,000 miles; 10,001-20,000 miles; 20,001-30,000; and so on through 240,001-250,000; with a final selection of "over 250,000 miles."

As each selection is made by the traveler, the list of options presented in successive drop down lists may be reduced to eliminate options that are not compatible with the previous selections. For example, if the traveler has selected "Ford" from the vehicle make drop down list 56, then the vehicle model drop down list 58 would typically only contain Ford vehicles.

Figure 7:
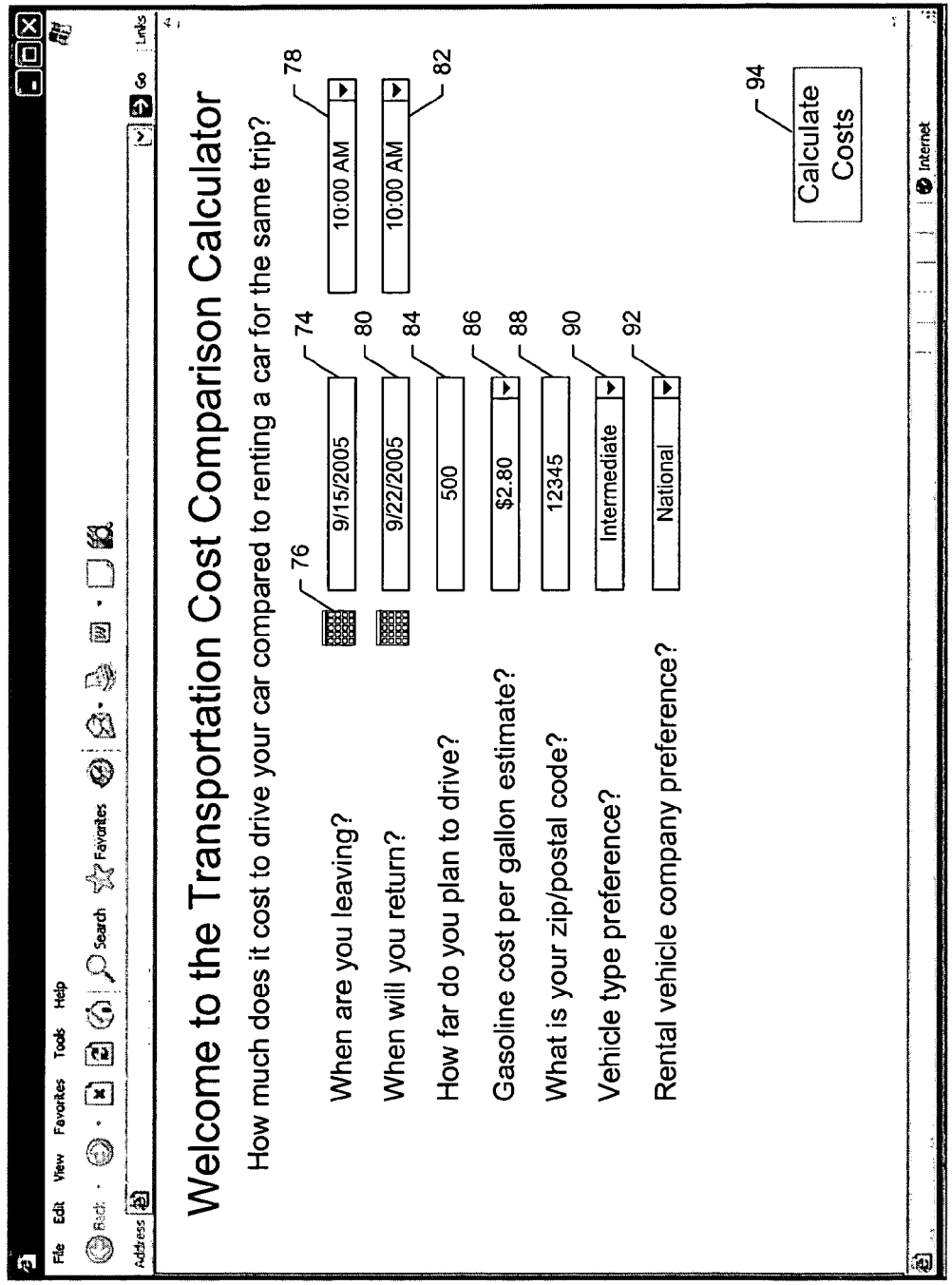

When all of the selections have been made on the request entry screen illustrated in FIG. 5, the traveler would typically select the "Continue" button 52 to advance to a subsequent request entry screen, such as the screen illustrated in FIG. 7, to enter information regarding the planned trip.

Referring now to FIG. 6, a screen shot in which the traveler is prompted to enter information corresponding to a leased vehicle is illustrated, according to one embodiment of the invention. Typically, the screen shot of FIG. 6 is depicted by the display element 20 in response to commands from the processing element 18 of the client device 16 which, in turn, is typically responding to instructions from the processing element 12 of the server 10. In the request entry screen of FIG. 6, the drop down list 50 for selecting "Own" or "Lease" may be displayed again to enable the traveler to change the selection. As in the request entry screen illustrated in FIG. 5 for a vehicle owned by the traveler, in the request screen illustrated in FIG. 6 the traveler is prompted to enter the model year of the traveler's personal vehicle using drop down list 54, the vehicle make using drop down list 56, the vehicle model using drop down list 58, the engine size using drop down list 60, the number of cylinders using drop down list 62, and the transmission type using drop down list 64.

The request entry screen for a leased vehicle will also typically request some information that is different than the information needed to calculate the cost of driving an owned vehicle. As illustrated in FIG. 6, the traveler will typically be prompted to indicate whether the traveler intends to purchase the leased vehicle at the expiration of the lease term, such as by selecting "yes" or "no" using drop down box 68. Whether the traveler intends to purchase the leased vehicle at the expiration of the lease term will typically affect the depreciation and maintenance costs. If the traveler intends to purchase the vehicle, then the mileage limit of the lease would not apply and questions related to the mileage limit may be grayed out or otherwise omitted. If the traveler does not intend to purchase the vehicle, the traveler will typically be prompted to indicate whether the planned trip fits within the mileage limit of the lease, such as by selecting "yes" or "no" using drop down box 70. If the traveler indicates that the planned trip would not fit within the mileage limit of the lease, then the traveler would typically have to pay a per-mile excess mileage fee and would therefore be prompted to enter the amount of the excess mileage fee, such as by using drop down box 72. The excess mileage fee drop down box 72 may enable the traveler to select the excess mileage fee in predefined increments, such as increments of $0.01 per mile from $0.01 up to $1.00. If the traveler indicates that the planned trip would fit within the mileage limit of the lease, then the question prompting the entry of the excess mileage fee would typically be grayed out or otherwise omitted. When all of the selections have been made on the request entry screen illustrated in FIG. 6, the traveler would typically select the "Continue" button 52 to advance to a subsequent request entry screen, such as the screen illustrated in FIG. 7, to enter information regarding the planned trip.

Referring now to FIG. 7, a screen shot of request entry screen in which the traveler is prompted to enter information corresponding to planned trip is illustrated, according to one embodiment of the invention. As before, the request entry screen is generally depicted by the display element 20 in response to commands from the processing element 18 of the client device 16 which, in turn, is typically responding to instructions from the processing element 12 of the server 10. Typically, the same information corresponding to the planned trip is requested regardless of whether the personal vehicle is owned or leased. In the request entry screen of FIG. 7, the traveler may be prompted to enter a planned departure date, such as by using drop down box 74 or calendar tool 76, and a planned departure time, such as by using drop down box 78. The traveler may also be prompted to enter a planned return date, such as by using drop down box 80 or a calendar tool, and a planned return time, such as by using drop down box 82. The planned departure and return information may be used to determine the total duration, in days, of the trip and to determine the cost of a rental vehicle. As rental vehicle price and availability information may only be available for a defined number of days into the future, the entry fields for this information may only allow the traveler to enter departure and return dates that fall within the defined number of days. Although not illustrated in FIG. 7, the traveler may also be prompted to enter a departure location and a destination location, such that the cost of other transportations options (e.g., airline and train) from the departure location to the destination location and back may be determined.

The traveler may be prompted to input the planned distance in miles of the trip, such as by using freeform text box 84 or, alternatively, the mileage may be determined automatically, typically by the processing element 12 of the server 10, based upon the departure and destination locations, such as through the use of on-line services that determine the driving distance between two points. The traveler may be prompted to input an estimate of the price per gallon of gasoline that the traveler expects to pay for the trip, such as by using drop down box 86. Alternatively, the price per gallon of gasoline may be automatically determined, again typically by the processing element 12 of the server 10, by accessing information that is available on-line relating to the cost of gasoline in various geographical regions. The distance information and the gasoline price may be used to calculate a portion of both the cost of driving the traveler's personal vehicle and of driving a rental vehicle, as discussed in detail below.

The traveler may be prompted to input the traveler's zip code, such as by using freeform text box 88. Alternatively, the traveler's zip code may be automatically determined, such as by the processing element 12 of the server 10, based upon the departure location input by the traveler. The traveler may also be prompted to input a rental vehicle preference, such as by using drop down box 90. The selection choices in drop down box 90 may be, for example, compact car, midsize car, full size car, convertible car, passenger van, sport utility vehicle, and pickup truck. The traveler may also be prompted to input a rental vehicle company preference, such as by using drop down box 92. The selection choices in drop down box 92 may include all rental vehicle companies for which rental pricing is available, as well as a "none" option. The zip code and rental vehicle preference information would typically be used to determine the cost of renting the vehicle, which is a portion of the cost of driving a rental vehicle on the trip.

When all of the selections have been made on the request entry screen illustrated in FIG. 7, the traveler would typically select the "Calculate Costs" button 94. This would typically cause the processing element 12 to calculate the total cost of driving the traveler's vehicle on the trip. See block 32 of FIG. 3. As mentioned above, the total cost of driving the traveler's vehicle on the trip will typically vary depending on whether the vehicle is owned or leased by the traveler. In one embodiment of the invention, the total cost of driving the vehicle owned by the traveler on the trip is calculated as the cost of gasoline plus the cost of maintenance plus the cost of depreciation. Gasoline cost would typically be calculated as the length of the trip (in miles) (based on traveler input) divided by the MPG (from the vehicle database) multiplied by the anticipated cost of gasoline per gallon (based on traveler input). As discussed above, maintenance cost may include two components, depending upon the current mileage of the traveler's vehicle. The first component, which may be termed normal maintenance, is calculated as the length of the trip (in miles) (based on traveler input) multiplied by the first maintenance cost per mile (from the vehicle database). If the current vehicle mileage is greater than the mileage lifespan, then the maintenance cost typically also includes a second component, which may be termed secondary maintenance, and may be added to the first component in one embodiment. Secondary maintenance is typically calculated as the length of the trip (in miles) (based on traveler input) multiplied by the second maintenance cost per mile (from the vehicle database). In an alternative embodiment, the first maintenance cost per mile may be used to determine the maintenance cost per mile when the vehicle mileage is less than a defined mileage threshold and the second maintenance cost per mile may be used to determine the maintenance cost per mile when the vehicle mileage is equal to or greater than the defined mileage threshold. Although embodiments of the invention are illustrated using two per-mile maintenance costs, it should be appreciated that more than two per-mile maintenance costs may be used, or a single per-mile maintenance cost may be used in alternative embodiments of the invention. Depreciation cost, using a straight line depreciation scale, is typically calculated as vehicle replacement cost (from the vehicle database) minus the vehicle's residual value (from the vehicle database, all divided by the mileage lifespan (from the vehicle database) and multiplied by the length of the trip (in miles) (based on traveler input).

In one embodiment of the invention, the total cost of driving the vehicle leased by the traveler on the trip is calculated as the cost of gasoline plus the cost of maintenance. The total cost may also include a depreciation cost and a contract mileage overage fee. Gasoline cost would typically be calculated as the length of the trip (in miles) (based on traveler input) divided by the MPG (from the vehicle database) multiplied by the anticipated cost of gasoline per gallon (based on traveler input). The per-mile maintenance cost for a leased vehicle will typically vary depending upon whether the traveler intends to purchase the vehicle at the expiration of the lease agreement (based on traveler input). For example, the per-mile maintenance cost if the traveler intends to purchase the vehicle may be twice the per-mile maintenance cost if the traveler does not intend to purchase the vehicle. The vehicle database may contain a single per-mile maintenance cost, such as the per-mile maintenance cost if the vehicle is to be purchased, which the processing element 12 may divide by two to determine the per-mile maintenance cost if the vehicle is not to be purchased at the expiration of the lease. Thus, in one embodiment of the invention, if the vehicle is to be purchased the cost of maintenance of driving the traveler's leased vehicle on the trip is calculated as the length of the trip (in miles) (based on traveler input) multiplied by the maintenance cost per mile (from the vehicle database). If the vehicle is not to be purchased, the cost of maintenance of driving the traveler's leased vehicle on the trip is calculated as the length of the trip (in miles) (based on traveler input) multiplied by the maintenance cost per mile (from the vehicle database) then divided by two.

Depreciation cost would also typically be added to the total cost of driving the leased vehicle on the trip if the traveler intends to purchase the vehicle at the expiration of the lease. Capital cost reduction is typically factored into the depreciation cost of a purchased lease vehicle. Depreciation cost, using a straight line depreciation scale, is typically calculated as vehicle replacement cost (from the vehicle database) minus the vehicle's residual value (from the vehicle database, all divided by the mileage lifespan (from the vehicle database) and multiplied by the length of the trip (in miles) (based on traveler input). A contract mileage overage fee may also be added to the total cost of driving the leased vehicle on the trip if the traveler has indicated that the trip will not fit within the mileage limit of the lease contract. The contract mileage overage fee is typically calculated as the length of the trip (based on traveler input) multiplied by the per-mile excess mileage fee (based on traveler input).

In embodiments of the invention described herein, the total cost of driving a personal vehicle includes only costs that vary based on the number of miles driven (which may be termed variable costs), such as maintenance, depreciation, and gasoline costs. In alterative embodiments of the invention, it may be desirable to include costs that do not vary based on the number of miles driven (which may be termed fixed costs), such as insurance and taxes.

A relatively large group of people may be planning to travel together on a trip, such as a family traveling on a vacation or a group of athletes traveling to a sporting event. Such a large group may desire to compare the cost of driving two or more personal vehicles (rather than a single personal vehicle, as a typical passenger vehicle may not be able to transport the group) to the cost of driving a relatively large rental vehicle, such as a van. Although not illustrated, embodiments of the invention may be capable of comparing the total cost of driving two or more personal vehicles to the total cost of driving a rental vehicle on the trip. In such embodiments, the traveler would typically be prompted to enter information corresponding to each of the two or more personal vehicles (e.g, the model year of each vehicle, the make and model of each vehicle, the engine size, number of cylinders, and transmission type of each vehicle).

The processing element 12 will then typically calculate the total cost of driving a rental vehicle on the trip. See block 34 of FIG. 3. The processing element 12 will typically transmit information to a GDS 26 or CRS 27 to enable the GDS or CRS to provide the cost of renting a vehicle for the duration of the trip. This information, derived from the traveler's input, typically includes the date and time of departure, the date and time of return, the traveler's zip code, the traveler's rental vehicle type preference, and the traveler's rental vehicle company preference (if provided). As discussed above, the cost information may alternatively be obtained from the computer systems of individual travel component suppliers or vendors or any suitable provider of travel component pricing. The GDS or CRS (or other source of transportation information) will typically return rental vehicle cost information, such as a per-day cost of the rental and/or a total rental cost for the duration of the trip, to the processing element 12. In addition to the cost information, the GDS or CRS will typically provide the make and model of a rental vehicle on which the cost information is based. In addition to the cost of renting the vehicle, the total cost of driving a rental vehicle on the trip will also typically include the cost of gasoline, which is typically calculated as the length of the trip (in miles) (based on traveler input) divided by the MPG of the rental vehicle (from the vehicle database and based on the make and model of the rental vehicle provided to the processing element 12 from the GDS or CRS) multiplied by the anticipated cost of gasoline per gallon (based on traveler input). In some situations, the GDS or CRS may not provide a make and model of the rental vehicle to the processing element 12. As such, the MPG of the rental vehicle (used to calculate the total cost of driving the rental vehicle) may be determined based on an average MPG of typical rental vehicles within the traveler's rental vehicle type preference. Such average MPG information for each vehicle type (e.g., subcompact, compact, midsize, full size, etc.) may be defined in the vehicle database or within a separate database.

The processing element 12 will then typically compare the total cost of driving the traveler's vehicle on the trip (either owned or leased) to the total cost of driving a rental vehicle on the trip. See block 36 of FIG. 3. The processing element will typically determine which is the less expensive option, and display that information for the traveler to review (discussed in detail below).

For either an owned vehicle or a leased vehicle, the processing element 12 will typically calculate the probability of mechanical failure of the traveler's personal vehicle. See block 38 of FIG. 3. If the current vehicle mileage (based on traveler input) is less than the moderate reliability mileage threshold (from the vehicle database), then the risk of a mechanical failure in the vehicle is typically low. If the current vehicle mileage (based on traveler input) is greater than the moderate reliability mileage threshold (from the vehicle database) but less than the significant mileage threshold (also from the vehicle database), then the risk of a mechanical failure in the vehicle is typically moderate. If the current vehicle mileage (based on traveler input) is greater than the significant reliability mileage threshold (from the vehicle database), then the risk of a mechanical failure in the vehicle is typically significant. While the foregoing example divides the mileage spectrum into three regions, other embodiments of the present invention may divide the mileage spectrum into fewer or more regions.

After the processing element 12 has calculated the total cost of driving the traveler's vehicle on the trip, the total cost of driving a rental vehicle on the trip, and the probability of mechanical failure of the traveler's personal vehicle, and after the processing element has compared the total cost of driving the traveler's vehicle on the trip to the total cost of driving a rental vehicle, the results of the calculations and the comparison will typically be displayed. See block 40 of FIG. 3. Referring now to FIG. 8, a screen shot of a results screen comparing the costs of transportation options is illustrated, according to one embodiment of the invention. In this regard, the results screen is commonly depicted by the display element 20 in response to commands from the processing element 18 of the client device 16 which, in turn, is typically responding to instructions from the processing element 12 of the server 10. The total cost of driving the traveler's vehicle (either owned or leased) on the trip would typically be displayed, such as in display box 96. The total cost of driving a rental vehicle on the trip would typically be displayed, such as in display box 98. As illustrated in FIG. 8, the display of this information may be customized, such as by using display box 99, to include information about the specific rental vehicle, such as the vehicle type (e.g., convertible) and/or the vehicle make and/or model (e.g., Mustang convertible). This additional information may help the traveler appreciate the added subjective value of some types of vehicles (e.g., the added driving enjoyment of a convertible). This added information may also be displayed in multiple locations on the display screen, as is illustrated in FIG. 8. The difference in cost between driving the traveler's personal vehicle and driving a rental vehicle would typically be displayed, such as in display box 100. This amount may indicate that driving a rental vehicle represents a cost savings compared to driving the traveler's personal vehicle or may indicate that driving a rental vehicle represents an additional cost compared to driving the traveler's personal vehicle. If driving a rental vehicle is more expensive than driving the traveler's personal vehicle, an appropriate message (e.g., "extra cost") would typically be displayed adjacent to the additional cost, such as in display box 102. Alternatively, if driving a rental vehicle is less expensive than driving the traveler's personal vehicle, an appropriate message (e.g., "you save") would typically be displayed (in display box 102) adjacent to the net savings.

The net additional cost or net savings displayed in box 100 may also be converted to a daily additional cost or a daily net savings, respectively, and displayed in display box 104. The net additional cost or net savings may be determined by dividing the total cost difference (i.e., the amount displayed in box 100) by the number of days in the trip (determined from the departure and return dates input by the traveler). As above, an appropriate message (e.g., "extra cost" or "you save") may be displayed in display box 106 to indicate whether driving a rental vehicle is less expensive than driving the traveler's personal vehicle.

The probability (e.g., low, moderate, significant) of mechanical failure of the traveler's personal vehicle that was calculated by the processing element 12 may also be displayed on the results screen, such as in display box 108. The data input fields for gasoline price (box 86), rental vehicle type preference (box 90), and rental vehicle company preference (box 92) may also be displayed on the results screen to enable the traveler to change the previous inputs. The traveler may change one or more of these inputs, and select the "Recalculate Costs" button 110, thereby causing the processing element to recalculate the costs and comparison of costs and display the recalculated results.

Although not illustrated in FIG. 3, the total cost of driving the traveler's personal vehicle may be compared to the total cost of traveling by airplane, train, or bus. The total cost of traveling by airplane, train, or bus typically includes the cost of purchasing a ticket from the transportation provider (e.g., the airline) or from a third party such as a travel planning website. The total cost of traveling by airplane, train, or bus may also include the cost of driving from the traveler's home to an airport, train station, or bus station, respectively, the cost of parking at the airport, train station, or bus station, respectively, and the cost of a rental vehicle at the destination location. As such, the processing element will typically determine the cost of such a ticket by transmitting information to a GDS 26 or CRS 27 (or other provider of transportation cost information) to enable the GDS or CRS to provide the ticket price for the desired trip. This information, derived from the traveler's input, typically includes the date and time of departure, the date and time of return, the departure location, the destination location, and the traveler's transportation provider preference (if provided) (e.g., the traveler may be prompted to input a preferred airline). The ticket price information may then be compared by the processing element 12 to the calculated cost of driving the traveler's personal vehicle. Two or more travelers may be planning to travel together on a trip. The cost difference between driving (either a personal vehicle or a rental vehicle) and traveling by airplane, train, or bus may be significantly greater when two or more travelers are planning to travel together (due primarily to the added cost of additional airplane, train, or bus tickets). As such, embodiments of the invention may be capable of calculating the total cost for two or more travelers to travel on the trip by airplane, train, or bus, and comparing the total cost of traveling by airplane, train, or bus to the total cost of driving a personal vehicle on the trip and/or to the total cost of driving a rental vehicle on the trip. In such embodiments, a traveler would typically be prompted to enter the total number of travelers. The traveler may also be prompted to enter a home address for each traveler, which traveler will be driving a personal vehicle to the airport, train station, or bus station, and personal vehicle information for such travelers, in order to calculate the cost of driving to and parking at the airport, train station, or bus station.

When the total cost of driving a personal vehicle on the trip and/or to the total cost of driving a rental vehicle on the trip is compared to the total cost of traveling by airplane, it may be desirable to consider extra costs that may result when driving to the destination takes substantially longer than flying. For example, consider a trip that is 1200 miles from the departure location to the destination location. A traveler may travel by airplane from the departure to the destination in approximately three to four hours. However, driving such a distance may take approximately twenty-four hours over two or three days. A traveler driving on such a trip would typically incur additional costs for lodging (e.g., hotel) and meals. In one embodiment of the invention, the traveler may be prompted to enter an estimate of the number of miles that the traveler is planning on driving per day, or an estimate of how many hours and/or days the traveler estimates it will take to drive from the departure to the destination. The processing element 12 may then estimate the additional costs of driving, such as lodging and meals, and include those additional costs in the total cost of driving a personal vehicle and/or the total cost of driving a rental vehicle.

According to one aspect of the invention, all or a portion of the system of one aspect of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

In this regard, FIG. 3 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for comparing a cost of driving a traveler's vehicle to a cost of other transportation options, the system comprising:
   a computing device capable of calculating a total cost to drive the traveler's vehicle on a trip, the traveler's vehicle defined by a vehicle make and a vehicle model, the trip at least partially defined by a number of miles from a departure location to a destination location; the computing device further capable of calculating a total cost to drive a rental vehicle on the trip, the trip further defined by a number of days from a beginning of the trip to an end of the trip, the rental vehicle defined by a vehicle type; and the computing device further capable of comparing the total cost to drive the traveler's vehicle on the trip to the total cost to drive the rental vehicle on the trip.

2. The system of claim 1, wherein the traveler's vehicle is further defined by at least one of a mileage, an engine size, a number of cylinders, and a transmission type.

3. The system of claim 1, wherein the computing device calculates the total cost to drive the traveler's vehicle on the trip based on a fuel cost per gallon, a fuel economy of the traveler's vehicle, and a maintenance cost per mile.

4. The system of claim 3, wherein the traveler's vehicle is owned by the traveler.

5. The system of claim 3, wherein the traveler's vehicle is leased by the traveler.

6. The system of claim 4, wherein the computing device calculates the total cost to drive the traveler's vehicle on the trip further based on a depreciation cost per mile if a mileage of the traveler's vehicle is less than a predefined lifespan mileage of the traveler's vehicle, and wherein the computing device calculates the total cost to drive the traveler's vehicle on the trip further based on a second maintenance cost per mile if the mileage of the traveler's vehicle is greater than the predefined lifespan mileage of the traveler's vehicle.

7. The system of claim 5, wherein the computing device calculates the total cost to drive the traveler's vehicle on the trip further based on a contract mileage overage fee if the mileage of the traveler's vehicle is greater than a predefined contract mileage limit.

8. The system of claim 7, wherein the computing device calculates the total cost to drive the traveler's vehicle on the trip further based on a depreciation cost per mile if the traveler is planning to buy the vehicle after an expiration of a predefined lease period.

9. The system of claim 1, wherein the computing device is further capable of calculating a total cost to travel on the trip via at least one additional transportation mode, the at least one additional transportation mode selected from the group comprising commercial airline, bus, and train; and wherein the computing device is further capable of comparing the total cost to travel via the at least one additional transportation mode to the total cost to drive the traveler's vehicle on the trip and to the total cost to drive the rental vehicle on the trip.

10. The system of claim 1, wherein the computing device is further capable of calculating a probability of an occurrence in the traveler's vehicle of a mechanical problem during the trip.

11. The system of claim 1, wherein the traveler's vehicle is a traveler's first vehicle, wherein the computing device is further capable of calculating a total cost to drive at least one additional traveler's vehicle on the trip, and wherein the computing device is further capable of comparing the total cost to drive the traveler's first vehicle and the at least one additional traveler's vehicle on the trip to the total cost to drive the rental vehicle on the trip.

12. The system of claim 1, wherein the computing device calculates the total cost to drive the traveler's vehicle on the trip further based on a cost of lodging and a cost of meals during the trip.

13. A method of comparing a cost of driving a traveler's vehicle to a cost of other transportation options, the method comprising:
   calculating a total cost to drive the traveler's vehicle on a trip, the traveler's vehicle defined by a vehicle make and a vehicle model, the trip at least partially defined by a number of miles from a departure location to a destination location;
   calculating a total cost to drive a rental vehicle on the trip, the trip further defined by a number of days from a beginning of the trip to an end of the trip, the rental vehicle defined by a vehicle type; and
   comparing the total cost to drive the traveler's vehicle on the trip to the total cost to drive the rental vehicle on the trip.

14. The method of claim 13, wherein the traveler's vehicle is further defined by at least one of a mileage, an engine size, a number of cylinders, and a transmission type.

15. The method of claim 13, wherein the total cost to drive the traveler's vehicle on the trip is based on a fuel cost per gallon, a fuel economy of the traveler's vehicle, and a maintenance cost per mile.

16. The method of claim 15, wherein the traveler's vehicle is owned by the traveler.

17. The method of claim 15, wherein the traveler's vehicle is leased by the traveler.

18. The method of claim 16, wherein the total cost to drive the traveler's vehicle on the trip is further based on a depreciation cost per mile if a mileage of the traveler's vehicle is less than a predefined lifespan mileage of the traveler's vehicle, and wherein the total cost to drive the traveler's vehicle on the trip is further based on a second maintenance cost per mile if the mileage of the traveler's vehicle is greater than the predefined lifespan mileage of the traveler's vehicle.

19. The method of claim 17, wherein the total cost to drive the traveler's vehicle on the trip is further based on a contract mileage overage fee if the mileage of the traveler's vehicle is greater than a predefined contract mileage limit.

20. The method of claim 19, wherein the total cost to drive the traveler's vehicle on the trip is further based on a depreciation cost per mile if the traveler is planning to buy the vehicle after an expiration of a predefined lease period.

21. The method of claim 13, further comprising:
   calculating a total cost to travel on the trip via at least one additional transportation mode, the at least one additional transportation mode selected from the group comprising commercial airline, bus, and train; and
   comparing the total cost to travel via the at least one additional transportation mode to the total cost to drive the traveler's vehicle on the trip and to the total cost to drive the rental vehicle on the trip.

22. The method of claim 13, further comprising:
   calculating a probability of an occurrence in the traveler's vehicle of a mechanical problem during the trip.

23. The method of claim 13, wherein the traveler's vehicle is a traveler's first vehicle, and wherein the method further comprises:
   calculating a total cost to drive at least one additional traveler's vehicle on the trip, and comparing the total cost to drive the traveler's first vehicle and the at least one additional traveler's vehicle on the trip to the total cost to drive the rental vehicle on the trip.

24. The method of claim 13, wherein the total cost to drive the traveler's vehicle on the trip is further based on a cost of lodging and a cost of meals during the trip.

25. A computer program product for comparing a cost of driving a traveler's vehicle to a cost of other transportation options, the computer program product comprising at least one computer-readable storage medium having computer-readable program code portions stored therein executable on a programmable apparatus and configured to direct the operation of the programmable apparatus, the computer-readable program code portions comprising:
   a first executable portion capable of calculating a total cost to drive the traveler's vehicle on a trip, the traveler's vehicle defined by a vehicle make and a vehicle model, the trip at least partially defined by a number of miles from a departure location to a destination location;
   a second executable portion capable of calculating a total cost to drive a rental vehicle on the trip, the trip further defined by a number of days from a beginning of the trip to an end of the trip, the rental vehicle defined by a vehicle type; and
   a third executable portion capable of comparing the total cost to drive the traveler's vehicle on the trip to the total cost to drive the rental vehicle on the trip.

26. The computer program product of claim 25, wherein the traveler's vehicle is further defined by at least one of a mileage, an engine size, a number of cylinders, and a transmission type.

27. The computer program product of claim 25, wherein the first executable portion calculates the total cost to drive the traveler's vehicle on the trip based on a fuel cost per gallon, a fuel economy of the traveler's vehicle, and a maintenance cost per mile.

28. The computer program product of claim 27, wherein the traveler's vehicle is owned by the traveler.

29. The computer program product of claim 27, wherein the traveler's vehicle is leased by the traveler.

30. The computer program product of claim 28, wherein the first executable portion calculates the total cost to drive the traveler's vehicle on the trip further based on a depreciation cost per mile if a mileage of the traveler's vehicle is less than a predefined lifespan mileage of the traveler's vehicle, and wherein the first executable portion calculates the total cost to drive the traveler's vehicle on the trip further based on a second maintenance cost per mile if the mileage of the traveler's vehicle is greater than the predefined lifespan mileage of the traveler's vehicle.

31. The computer program product of claim 29, wherein the first executable portion calculates the total cost to drive the traveler's vehicle on the trip further based on a contract mileage overage fee if the mileage of the traveler's vehicle is greater than a predefined contract mileage limit.

32. The computer program product of claim 31, wherein the first executable portion calculates the total cost to drive the traveler's vehicle on the trip further based on a depreciation cost per mile if the traveler is planning to buy the vehicle after an expiration of a predefined lease period.

33. The computer program product of claim 25, further comprising:
   a fifth executable portion capable of calculating a total cost to travel on the trip via at least one additional transportation mode, the at least one additional transportation mode selected from the group comprising commercial airline, bus, and train; and a sixth executable portion capable of comparing the total cost to travel via the commercial airline to the total cost to drive the traveler's vehicle on the trip and to the total cost to drive the rental vehicle on the trip.

34. The computer program product of claim 25, further comprising:

a fifth executable portion capable of calculating a probability of an occurrence in the traveler's vehicle of a mechanical problem during the trip.

35. The computer program product of claim 25, wherein the traveler's vehicle is a traveler's first vehicle, wherein the first executable portion is further capable of calculating a total cost to drive at least one additional traveler's vehicle on the trip, and wherein the third executable portion is further capable of comparing the total cost to drive the traveler's first vehicle and the at least one additional traveler's vehicle on the trip to the total cost to drive the rental vehicle on the trip.

36. The computer program product of claim 25, wherein the first executable portion calculates the total cost to drive the traveler's vehicle on the trip further based on a cost of lodging and a cost of meals during the trip.

* * * * *